United States Patent Office 3,726,892
Patented Apr. 10, 1973

3,726,892

CERTAIN 5-SULFAMOYL-1,3,4-THIADIAZOL-2-YLUREAS

Tony Cebalo, Indianapolis, Ind., assignor to Air Products and Chemicals, Inc., Allentown, Pa.

No Drawing. Continuation-in-part of application Ser. No. 867,385, Oct. 17, 1969. This application Oct. 2, 1970, Ser. No. 77,719
Int. Cl. C07d 91/62
U.S. Cl. 260—306.8 D 14 Claims

ABSTRACT OF THE DISCLOSURE

Novel thiadiazole compounds are produced having the general structure:

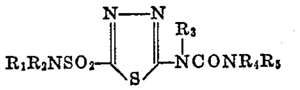

wherein $R_1$ is hydrogen or a substituted or unsubstituted lower acyclic hydrocarbon radical, the substituents being selected from the class consisting of halo, hydroxy, cyano, and lower alkoxy, $R_2$ is $R_1$ or a lower alkoxy radical, except that $R_1$ and $R_2$ cannot both be hydrogen, $R_3$ is hydrogen or a lower acyclic hydrocarbon radical, $R_4$ is hydrogen, a lower acyclic hydrocarbon radical, or a lower cycloalkyl radical, and, $R_5$ is hydrogen, a lower cycloalkyl radical, a lower alkoxy radical or a substituted or unsubstituted lower acyclic hydrocarbon radical, the substituents being selected from the class consisting of halo, hydroxy, cyano, or lower alkoxy, except that $R_4$ and $R_5$ cannot both be hydrogen or a lower cycloalkyl radical. The compounds and derivatives thereof have particular use as herbicides.

CROSS-REFERENCE TO RELATED APPLICATIONS

This applications is a continuation-in-part of my copending application, Ser. No. 867,385, filed Oct. 17, 1969, now abandoned.

BACKGROUND OF THE INVENTION

This invention relates to thiadiazoles. More particularly it relates to thiadiazol-2-ylureas containing a sulfonamide group in the 5-position.

The prior art is replete with thiadiazoles and various derivatives thereof. However, none are believed to have the specific structure or types of activities claimed in the present invention. The few somewhat related compounds shown in the prior art such as, for example, 1-(5-methyl-1,3,4-thiadiazol-2-yl)-3-phenylthiourea and 1-(5-methyl-1,3,4-thiadiazol-2-yl)-3-phenylurea [J. Pharm. Soc. Japan 74, 1044–8 (1054); CA 11630] were not reported to have biological activity. Compounds similar to the present invention are also disclosed in Belgian Patent 721,034.

An article in Farmaco Ed. Sci. 22 (6), 392–401 (1967) discloses the use of 1-(5-alkyl-1,3,4-thiadiazol-2-yl)ureas as intermediates for the production of isomeric 1,3-bis-(5-alkyl-1,3,4-thiadiazol-2-yl)ureas which latter compounds are alleged to exhibit hypoglycemic action. These compounds are only generally related to those of the instant invention.

SUMMARY OF THE INVENTION

The invention pertains to thiadiazoles and derivatives thereof which have utility as agricultural pesticides. The thiadiazoles may be represented most broadly, as having the structure:

wherein $R_1$ is hydrogen or a substituted or unsubstituted lower acyclic hydrocarbon radical, the substituents being selected from the class consisting of halo, hydroxy, cyano, and lower alkoxy, $R_2$ is $R_1$ or a lower alkoxy radical, except that $R_1$ and $R_2$ cannot both be hydrogen, $R_3$ is hydrogen or a lower acyclic hydrocarbon radical, $R_4$ is hydrogen, a lower acyclic hydrocarbon radical, or a lower cycloalkyl radical, and, $R_5$ is hydrogen, a lower cycloalkyl radical, a lower alkoxy radical or a substituted or unsubstituted lower acyclic hydrocarbon radical, the substituents being selected from the class consisting of halo, hydroxy, cyano, or lower alkoxy, except that $R_4$ and $R_5$ cannot both be hydrogen or a lower cycloalkyl radical.

The terms "lower acyclic hydrocarbon radical," "lower cycloalkyl radical," and "lower alkoxy radical" are intended to mean such radicals containing up to seven carbon atoms.

It is to be understood that in Structure (I) above, where $R_3$ is hydrogen, it may exist in the tautomeric form:

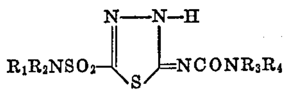

where $R_1$, $R_2$, $R_3$ and $R_4$ have the designations hereinbefore set forth. Therefore, in compositions of the invention where $R_3$ is hydrogen, the above tautomeric structure is always implied to exist.

The symbols $R_1$, $R_2$, $R_3$, $R_4$, and $R_5$ will have the same meaning throughout the entirety of the specification and claims.

The compounds show excellent activity as agricultural pesticides, particularly as herbicides, for controlling a broad spectrum of unwanted and undesirable weeds and plants.

PREFERRED EMBODIMENTS OF THE INVENTION

Methods of synthesis

Generally, the compounds of the present invention may be prepared by one or more of the synthesis routes set forth below. The type of product desired will determine the particular synthesis route to be employed.

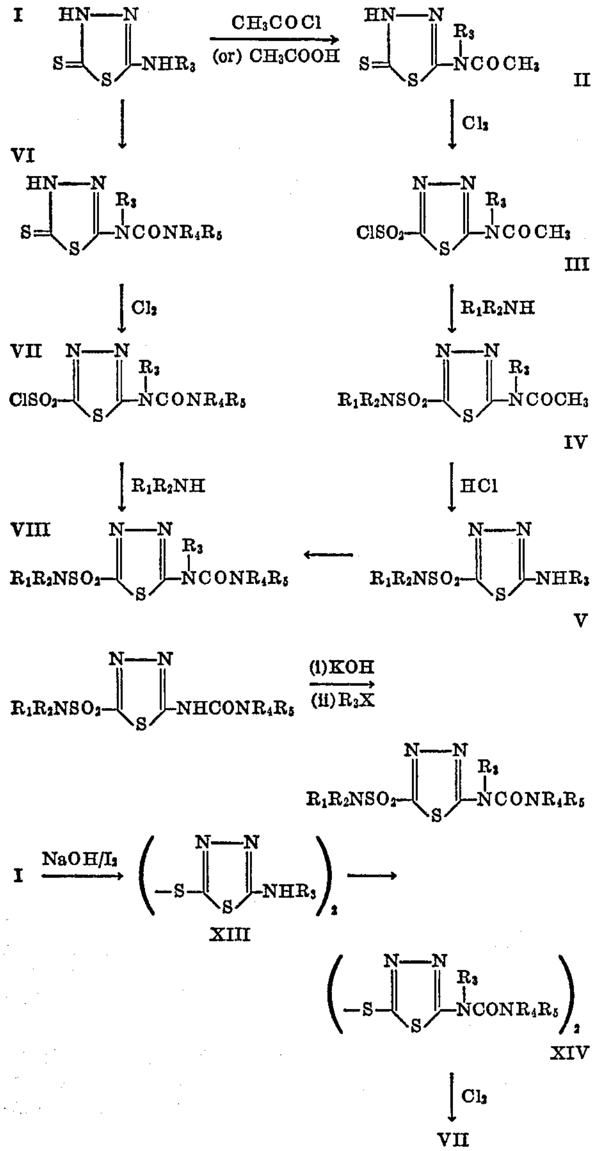

The designations for $R_1$ through $R_5$ have been previously described and the method of synthesis of any of the above described compounds is dependent upon the desired compound.

Generally, the compounds corresponding to Formula I are known; however, others are prepared by standard methods. The 5-acetamido-1,3,4-thiadiazoles (II) utilized are prepared by known methods from (I) and the corresponding sulfonyl chlorides (III) are also prepared by known methods. A particularly useful method is that of Petrow et al. (J. Chem. Soc. 1508, 1958). The sulfonamides (IV) are prepared by the reaction of the sulfonyl chlorides with primary or secondary amines in aqueous or non-aqueous solutions at temperatures of 0–60° C., preferably in the range 0–10° C. For non-aqueous reactions inert solvents such as benzene, halogenated hydrocarbons, tetrahydrofuran and the like can be used. The 2-amino-5-sulfonamido-1,3,4-thiadiazoles (V) are obtained by the treatment of compounds (IV) with concentrated hydrochloric acid according to the method of Petrow et al. (loc. cit.).

A number of 2-ureido-1,3,4-thiadiazole sulfonyl chlorides (VII) and 2-ureido-1,3,4-thiadiazole sulfonamides (VIII) are prepared by methods similar to those employed to produce compounds (III) and (IV).

Other ureido compounds may be derived from compound (V) according to a variety of methods which are used for the preparation of such compounds and which are well documented in the chemical literature. For example, compounds of Structure (V) may be reacted with isocyanates in an inert solvent such as benzene, dimethylformamide, ethyl acetate and the like. A catalyst such as triethylamine may be employed for this reaction.

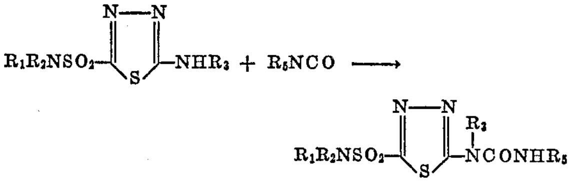

Another reaction which may be employed is that in which a carbamoyl chloride is reacted with an amine in the presence of an acid fixing compound such as sodium carbonate, triethylamine, pyridine and the like. Another variation of this reaction is the reaction of a metal derivative of an amine with a carbamoyl chloride. Inert solvents such as benzene, tetrahydrofuran, dimethyl formamide, dioxane and the like may be used to carry out the above reaction.

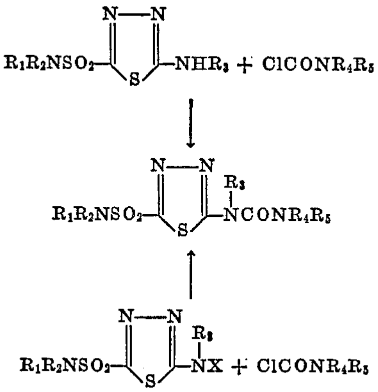

X=Na, K or Li

A further reaction which may be employed is that in which NN'-carbonyldiimidazole is reacted with an aminothiadiazole to give an intermediate isocyanate which is then further reacted with an amine to produce the desired product.

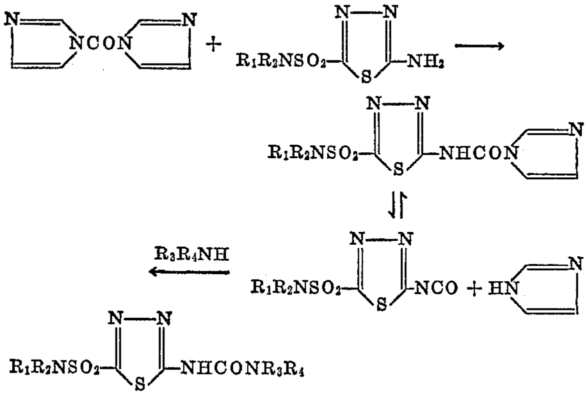

Phosgene may also be reacted with an amine to give a carbamoyl chloride which is then further reacted with a primary or secondary amine to produce the desired urea product. This reaction may be carried out in the presence of a base, e.g., tertiary amine, and/or a catalyst such as boron trifluoride-ether complex. These reactions can also be carried out in inert solvents such as aromatic hydrocarbons, dimethyl formamide, tetrahydrofuran and the like.

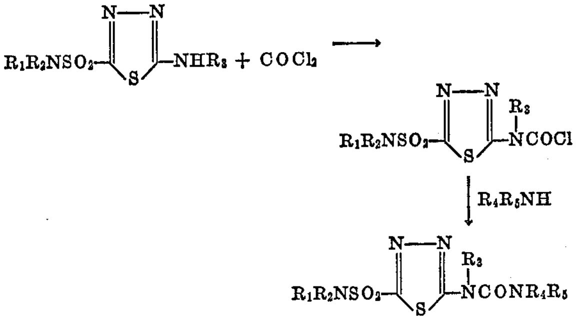

The ureas of the invention which correspond to the generic Formula IX will form metal or ammonium salts (substituted or unsubstituted) corresponding to Structure (X). For polyvalent metals, these salts are chelate in character. The alkali metal and ammonium salts also possess the highly desirable property, for agricultural applications, of being water soluble. Furthermore, alkali metal salts are found to react with reactive halogen compounds, e.g., alkyl halides, to produce derivatives as shown in (XI) and (XII) below.

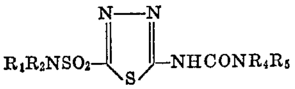

IX

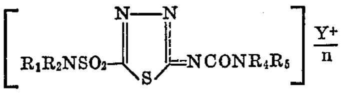

Y=metal or ammonium radical
n=equivalence of Y

X

XI

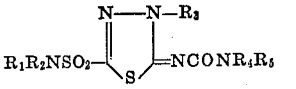

XII

The following examples are illustrative of the invention and are not intended to limit the scope thereof.

SYNTHESIS OF INTERMEDIATES

Example 1

To a well stirred mixture containing 231 gms. of polyphosphoric acid and 488 gms. of acetic acid and heated to 100° C. was added 300 gms. of 2-amino-5-mercapto-1,3,4-thiadiazole. Upon complete addition of the thiadiazole, the mixture was stirred for an additional 1 hour at 120° C. The mixture was cooled to 60° C. and poured into ice water to provide a solid residue which was subsequently separated by filtering. The residue was dissolved in 10% sodium hydroxide (the small amount of insolubles being removed by filtering) and the solution being adjusted to a pH of 1 with 6 N hydrochloric acid. The solid product was identified to be 2-acetamido-5-mercapto-1,3,-4-thiadiazole having a melting point of 293°–294° C.

Example 2

One hundred fifty grams of 2-acetamido-5-mercapto-1,3,4-thiadiazole was suspended in 3.5 litres of 70% acetic acid and cooled to a temperature of 0°–5° C. A stream of chlorine gas was slowly bubbled through the cooled mixture at the above temperature for about 2 hours with vigorous stirring. The solids were separated by filtering, washed with ice water and air dried. The solid product was identified to be 2-acetamido-5-chlorosulfonyl-1,3,4-thiadiazole having a melting point of 237°–239° C.

Example 3

Two hundred fifty mls. of a 40% solution of aqueous dimethylamine was added to 168.5 gms. of 2-acetamido-5-chlorosulfonyl-1,3,4-thiadiazole while maintaining the temperature below 20° C. After stirring the mixture for about 4 hours the mixture was acidified with 6 N hydrochloric acid, the solids separated by filtration and washed thoroughly with water. The solid product was identified to be 2-acetamido-5-NN-dimethylsulfonamido-1,3,4-thiadiazole having a melting point of 258°–260° C.

Example 4

A mixture containing 181.6 gms. of 2-acetamido-1,3,4-thiadiazole-5-NN-dimethylsulfonamide and 1000 mls. of concentrated hydrochloric acid was refluxed for about 3½ hours. The mixture was cooled to room temperature, filtered and the filtrate concentrated to dryness under vacuum. The solid residue was admixed with 200 mls. of 10% aqueous sodium carbonate and filtered. The resulting solid residue was identified to be 2-amino-1,3,4-thiadiazole-5-NN-dimethylsulfonamide and having a melting point of 184°–186° C.

Example 5

A mixture containing 8.0 gms. of 2-amino-5-mercapto-1,3,4-thiadiazole, 3.4 gms. of methylisocyanate and 150 mls. of NN-dimethylformamide was heated to 50° C. for about 1 hour. The reaction mixture was concentrated under vacuum and ice water subsequently added to the concentrate. The solid residue was separated by filtration and identified to be 1-methyl-3-(5-mercapto-1,3,4-thiadiazol-2-yl)urea having a melting point of 234° C.

Example 6

Sixty gms. of 1-methyl-3-(5-mercapto-1,3,4-thiadiazol-2-yl)urea was suspended in 1.32 litres of 70% acetic acid, the mixture being formed in a flask equipped with a mechanical stirring means. The mixture was cooled to about 5° C. and chlorine gas slowly bubbled through for about 45 minutes while maintaining the 5° C. temperature. The resulting solids were separated by filtration, washed with water and air dried. The product was identified to be 1-methyl-3-(5-chlorosulfonyl-1,3,4-thiadiazol-2-yl)urea having a melting point of 141° C.

SYNTHESIS OF FINAL PRODUCTS

Example 7

Twenty gms. of 1-methyl-3-(5-chlorosulfonyl-1,3,4-thiadiazol-2-yl)urea was dissolved, with stirring, in 250 mls. of a 40% aqueous solution of methylamine while maintaining the temperature of the reaction from about 5°–7° C. After stirring for an additional 1½ hours, the mixture was acidified to pH 1 with 6 N hydrochloric acid, the solids separated by filtration and subsequently washed with water. The final product was identified to be 1-methyl-3-(5-N-methylsulfamoyl-1,3,4-thiadiazol-2-yl)urea having a melting point of 232°–233° C.

Example 8

A mixture containing 4.1 gms. of 2-amino-1,3,4-thiadiazole-5-NN-dimethylsulfonamide and 1.3 gms. of methylisocyanate was refluxed in anhydrous benzene for 3 hours. The mixture was cooled to 10° C., the solid product separated by filtration and subsequently crystallized from ethanol. The final product was identified to be 1-methyl-3-(5-NN-dimethylsulfamoyl-1,3,4-thiadiazol-2-yl)urea having a melting point of 223°–235° C.

Example 9

A mixture containing 18.0 gms. of 2-amino-1,3,4-thiadiazole-5-(N-methyl-N-butyl)sulfonamide, 5.4 gms. of methylisocyanate and 300 mls. of anhydrous dimethylformamide was heated to and maintained at 50° C. for about 1 hour. The dimethylformamide was removed under vacuum and the solid residue crystallized from solox. The final product was identified to be 1-methyl-3-(5-N-butyl-N - methylsulfamoyl - 1,3,4-thiadiazol-2-yl)urea having a melting point of 192°–193° C.

Example 10

The procedure of Example 9 was substantially repeated except that 13.8 gms. of 2-amino-1,3,4-thiadiazole-5-butylsulfonamide, 4.3 gms. of methylisocyanate and 250 mls. of anhydrous dimethylformamide were employed. The final product was identified to be 1-methyl-(5-N-butylsulfamoyl-1,3,4-thiadiazol-2-yl)urea having a melting point of 186°–187° C.

Example 11

A mixture containing 28.2 gms. of 2-amino-1,3,4-thiadiazole-5-NN-dimethylsulfonamide, and 12.5 gms. cyclopropylisocyanate and 400 mls. of anhydrous dimethylformamide was heated to and maintained at 50° C. for about 1 hour. The dimethylformamide was removed under vacuum, leaving a solid residue which was crystallized from methanol. The final product was identified to be 1-cyclopropyl-3-(5-NN-dimethylsulfamoyl - 1,3,4 - thiadiazol-2-yl)urea having a melting point of 216° C.

Example 12

A mixture containing 20 gms. of 2-amino-5-morpholinosulfonyl-1,3,4-thiadiazole, 6.0 gms. of methylisocyanate and 200 mls. of anhydrous dimethylformamide was heated to and maintained at 50° C. for about 1 hour. The dimethylformamide was removed under vacuum and the solid residue crystallized from a benzene-methanol mixture. The resulting product was identified to be 1-methyl-3-(5-morpholinosulfonyl - 1,3,4 - thiadiazol-2-yl) urea having a melting point of 245°–246° C.

Example 13

To a mixture containing 28.2 gms. of 2-amino-1,3,4-thiadiazole-5-NN-dimethylsulfonamide and 18.4 gms. of N-butyl-N-methyl carbamoyl chloride in 150 mls. of anhydrous tetrahydrofuran, was added in small portions, 4.7 gms. of sodium hydride. The reaction mixture was stirred for 1½ hours, water added and the mixture subsequently extracted with ethyl acetate. The ethyl acetate solution was dried over anhydrous sodium sulfate and concentrated under vacuum. The solid residue was crystallized from ethyl acetate. The final product was identified to be 1-butyl-1-methyl-3-(5-NN-dimethylsulfamoyl - 1,3,4 - thiadiazol-2-yl)urea having a melting point of 163°–165° C.

Example 14

To a mixture containing 100 mls. of methanol, and 10 gms. 1-methyl-3-(5-NN-dimethylsulfamoyl - 1,3,4 - thiadiazol-2-yl)urea was added 2.4 gms. of potassium hydroxide and 5.4 gms. of methyl iodide, the entire mixture being refluxed for 30 minutes. The solids were separated by filtration and the filtrate concentrated under vacuum to provide a solid residue. The residue was recrystallized from methanol. The final product was identified to be 1,3-dimethyl-3-(5 - NN - dimethylsulfamoyl-1,3,4-thiadiazol-2-yl)urea having a melting point of 209°–212° C.

Example 15

To a mixture of 6 gms. of NN'-carbonyldiimidazole in dry tetrahydrofuran, under an atmosphere of nitrogen, was added 3.5 gms. of 2-amino-1,3,4-thiadiazole-5-NN-dimethylsulfonamide. The mixture was stirred at room temperature for 30 minutes and subsequently refluxed for about 15 minutes. The reaction mixture was cooled to room temperature and 5.6 gms. of triethylamine and 5.4 gms. of N,O-dimethylhydroxylamine hydrochloride were added. The resulting mixture was stirred for about 15 minutes after which the mixture was poured into ice water. The solid residue was separated by filtering and the residue subsequently crystallized from methanol. The final product was identified to be 1-methyl-1-methoxy-3-(5-NN-dimethylsulfamoyl - 1,3,4 - thiadiazol-2-yl)urea having a melting point of 147°–149° C.

Additional compounds of the invention were prepared in accordance with the procedures set forth above.

| Example | $R_1$ | $R_2$ | $R_3$ | $R_4$ | $R_5$ | Melting point, ° C. |
|---|---|---|---|---|---|---|
| 16 | $CH_3$ | $CH_3$ | H | H | $CH_2CH_2CH_3$ | 213–215 |
| 17 | $CH_3$ | $CH_3$ | H | H | $CH_3$ | 187–189 |
| 18 | $CH_2{=}CHCH_2$ | H | H | H | $CH_3$ | 166–168 |
| 19 | $C_3H$ | $C_3H$ | H | H | $CH_3$ | 158–159 |

Example 20

To a stirred suspension of 80 gms. of 5-methylamino-2-mercapto-1,3,4-thiadiazole in 300 mls. of methanol was added, in small portions, 26 gms. of sodium hydroxide. The stirring was continued until a complete solution was obtained (a small amount of insoluble material being removed by filtration). Iodine (66.4 gms.) dissolved in 350 mls. of methanol was next added dropwise to the above stirred solution. A yellow precipitate began to separate after approximately half of the iodine solution had been added. After complete addition of the iodine solution the solids were filtered off and washed with a little methanol to give the desired di-5-(methylamino-1,3,4-thiadiazolyl) disulfide (XIII, $R_3{=}CH_3$) having a melting point of 202–204° C.

Example 21

A mixture containing 4 gms. of di-5-(2-methylamino-1,3,4-thiadiazolyl) disulfide, 1.6 gms. of methylisocyanate, and 20 mls. of NN-dimethylformamide was heated at 100° C. for 1.75 hours. Water was next added to the reaction mixture until a precipitate appeared. The total solids which precipitated on further cooling were removed by filtration and were washed thoroughly with water. The resulting product was identified to be di-5-[1,3-dimethyl-3-(1,3,4-thiadiazol - 2 - yl)urea] disulfide (XIV, $R_4{=}H$; $R_3{=}R_5{=}CH_3$) having a melting point of 219–221° C.

Example 22

Four gms. of di-5-[1,3-dimethyl-3-(1,3,4-thiadiazol-2-yl)urea] disulfide was suspended in 120 mls. of 70% acetic acid, the mixture being formed in a flask with mechanical stirring means. The mixture was cooled to about 10° C. and chlorine gas slowly bubbled through for 1 hour while maintaining a temperature range of 10°–15° C. After approximately 30 minutes the reaction mixture became clear. The reaction mixture was next diluted with water and extracted with chloroform. The chloroform solution was washed with water, dried ($Na_2SO_4$) and concentrated under vacuum to give the desired 1,3-dimethyl-3-(5-chlorosulfonyl-1,3,4-thiadiazol - 2 - yl)urea having a melting point of 98–100° C. (dec.).

Example 23

To a stirred mixture containing 1.5 gms. of 1,3-dimethyl-3-(5-chlorosulfonyl-1,3,4-thiadiazol-2-yl)urea and 0.5 gms. of dimethylhydroxylamine hydrochloride in 20 mls. of tetrahydrofuran was added, dropwise, 1.0 gms. of triethylamine in 5 mls. of tetrahydrofuran and the reaction mixture stirred overnight at room temperature. The reaction mixture was next filtered and the filtrate concentrated under vacuum to a solid residue. This solid was dissolved in ethyl acetate, washed successively with dilute hydrochloric acid and water, dried ($Na_2SO_4$) and concentrated under vacuum. The residual solid was crystallized from aqueous methanol. The final product was identified to be 1,3-dimethyl-3[5-(N-methoxy-N-methyl) sulfamoyl-1,3,4-thiadiazol-2-yl]urea having a melting point of 190–192° C.

The following additional compounds of the invention were prepared using the above procedures.

| Example | $R_1$ | $R_2$ | $R_3$ | $R_4$ | $R_5$ | Melting point, ° C. |
|---|---|---|---|---|---|---|
| 24 | $C(CH_3)_3$ | H | H | H | $CH_3$ | 247–249 |
| 25 | $CH_3$ | 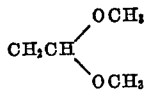 | H | H | $CH_3$ | 156–158 |
| 26 | H | H | H | H | $CH_3$ | [1] 245–247 |
| 27 | $ClCH_2CH_2$ | H | H | H | $CH_3$ | 197–199 |
| 28 | $CH_3$ | $CH_3O$ | H | H | $CH_3$ | 167–169 |
| 29 | $CH_3CHCH_2OCH_3$ | H | H | H | $CH_3$ | 174–176 |
| 30 | $CH_2CN$ | $CH_3$ | $CH_3$ | H | $CH_3$ | 203–202 |
| 31 | $CH_2CN$ | $C_4H_9$ | H | H | $CH_3$ | 127–130 |

[1] Decomposes.

BIOLOGICAL ACTIVITY OF FINAL PRODUCTS

The herbicidal activity of products of the invention were tested in accordance with the procedure hereinafter set forth. For pre-emergence testing the soil in which seeds were planted was sprayed the same day with a solution containing the designated amount of product in a 50–100% acetone-water mixture. Observations of activity were recorded twenty-one (21) to twenty-eight (28) days after planting and spraying. For post-emergence testing the plants were sprayed with the same solution as described above about fourteen (14) days after planting of the seeds. A vigor and kill rating was adopted to assess the phytotoxicant properties of the products. For both testing procedures a percent kill rating for each species of plants was obtained by comparing the stand of treated plantings with untreated control plants growing under similar conditions. A vigor rating of 1 to 5 was given to those plants not killed by chemical treatment and is defined as follows:

(1) severe injury, plants will die
(2) moderate to severe injury, plants are not expected to recover from chemical treatment
(3) moderate injury, plants are expected to show various degrees of recovery from chemical treatment
(4) slight injury, plants will or have recovered and will resume normal growth
(5) no apparent injury The following tables show the pre- and post-emergence herbicidal activity of compounds of the invention.

The evaluated plant species are identified below as to their corresponding Latin names:

Sugar Beets: *Beta vulgaris*
Corn: *Zea mays*
Oats: *Avena sativa*
Clover: *Melilotus indica*
Soybeans: *Glycine max*
Cotton: *Gossypium hirsutum*
Mustard: *Brassica juncea*
Yellow Foxtail: *Setaria glauca*
Barnyard grass: *Echinochloa crusgalli*
Crabgrass: *Digitaria sanguinalis*
Buckwheat: *Fagopyrum tataricum*
Morning glory: *Ipomoca purpurca*
Pigweed: *Amaranthus retroflexus*
Jimson weed: *Datura stramonium*

When utilized for herbicidal purposes, compounds of the invention may be formulated in a variety of ways and concentrations for application to the locus of desired vegetation control. It is recognized that the particular type and concentration of formulation, as well as the mode of application of the active ingredient, may govern its biological activity in a given application.

Compounds of the invention may be prepared as simple solutions of the active ingredient in an appropriate solvent in which it is completely soluble at the desired concentration. Such solvent systems include water, alcohols, acetone, aqueous alcohol and acetone, and other organic solvents. These simple solutions may be further modified by the addition of various surfactants, emulsifying or dispersing agents, colorants, odorants, anti-foaming agents, other herbicides or herbicidal oils which supplement or synergize the activity of the herbicides of the invention, or other adjuvants for any given application where deemed desirable to impart a particular type or degree of plant responses.

Compounds of the invention may also be formulated in various types of formulations commonly recognized by those skilled in the art of agricultural or industrial chemicals. These formulations include, for example, compositions containing the active ingredient as granules of relatively large particle size, as powder dusts, as wettable powders, as emulsifiable concentrates or as a constituent part of any other known type of formulation commonly utilized by those skilled in the art. Such formulations include the adjuvants and carriers normally employed for facilitating the dispersion of active ingredient for agricultural and industrial applications of phytotoxicants. These formulations may contain as little as 0.25% or more than 95% by weight of the active ingredient.

Dust formulations are prepared by mixing the active ingredient with finely divided solids which act as dispersants and carriers for the phytotoxicant in applying it to the locus of application for vegetation control. Typical solids which may be utilized in preparing dust formulations of the active ingredients of the invention include talc, kieselguhr, finely divided clay, fullers' earth, or other common organic or inorganic solids. Solids utilized in preparing dust formulations of the active ingredient normally have a particle size of 50 microns or less. The active ingredient of these dust formulations is present commonly from as little as 0.25% to as much as 30% or more by weight of the composition.

Granular formulations of the active ingredients are prepared by impregnating or adsorbing the toxicant on or into relatively coarse particles of inert solids such as sand, attapulgite clay, gypsum, corn cobs or other inorganic or organic solids. The active ingredient of these granular formulations is commonly present from 1.0% to as much as 20.0% or more by weight of the composition.

Wettable powder formulations are solid compositions of matter wherein the active ingredient is absorbed or adsorbed in or on a sorptive carrier such as finely divided clay, talc, gypsum, lime, wood flour, fullers' earth, kieselguhr or the like. These formulations preferably are made to contain 50% to 80% of active ingredient. These wettable powder formulations commonly contain a small amount of a wetting, dispersing or emulsifying agent to facilitate dispersion in water or other liquid carrier utilized to distribute the phytotoxicant to the locus of desired vegetation control.

TABLE I

Pre-Emergent Activity

| Product of Example No. | Lbs. per acre | Sugar beets | | Corn | | Oats | | Clover | | Soybeans | | Cotton | | Mustard | | Yellow foxtails | | Barnyard grass | | Crabgrass | | Buckwheat | | Morning-glory | |
|---|---|---|---|---|---|---|---|---|---|---|---|---|---|---|---|---|---|---|---|---|---|---|---|---|---|
| | | Vig | Percent kill | Vig | Percent kill | Vig | Percent kill | Vig | Percent kill | Vig | Percent kill | Vig | Percent kill | Vig | Percent kill | Vig | Percent kill | Vig | Percent kill | Vig | Percent kill | Vig | Percent kill | Vig | Percent kill |
| 8 | 4 | | 100 | | 100 | | 100 | | 100 | | 100 | 3 | 80 | | 100 | | 100 | | 100 | | 100 | | 100 | 5 | 0 |
| | 2 | | 100 | 3 | 20 | 1 | 80 | | 100 | 3 | 0 | 4 | 20 | 3 | 60 | | 100 | | 100 | | 100 | | 100 | 5 | 0 |
| | 1 | | 100 | 4 | 0 | 1 | 80 | | 100 | 5 | 0 | 4 | 0 | 4 | 20 | | 100 | | 100 | | 100 | | 100 | 5 | 0 |
| | 0.5 | 3 | 0 | 5 | 0 | 5 | 0 | 4 | 60 | 5 | 0 | 5 | 0 | 5 | 0 | 4 | 0 | 3 | 40 | 4 | 20 | 4 | 0 | 5 | 0 |
| 14 | 4 | | 100 | | 100 | 1 | 80 | | 100 | | 100 | | 100 | | 100 | | 100 | | 100 | | 100 | | 100 | | 100 |
| | 2 | | 100 | 1 | 60 | | 100 | | 100 | | 100 | | 100 | | 100 | | 100 | | 100 | | 100 | | 100 | | 100 |
| | 1 | | 100 | 3 | 0 | 3 | 20 | | 100 | | 100 | | 100 | 3 | 100 | 2 | 80 | | 90 | | 100 | | 100 | | 100 |
| | 0.5 | 4 | 80 | 4 | 0 | 4 | 10 | | 100 | | 100 | 4 | 0 | 3 | 60 | 3 | 0 | 3 | 30 | 3 | 40 | | 100 | | 100 |
| 15 | 4 | | 100 | 4 | 0 | 1 | 90 | | 100 | | 100 | | 100 | | 100 | | 100 | | 100 | | 100 | | 100 | | 100 |
| | 2 | | 100 | 5 | 0 | 1 | 90 | | 100 | | 100 | | 100 | | 100 | 4 | 10 | | 100 | | 100 | | 100 | | 100 |
| | 1 | | 100 | 5 | 0 | 4 | 0 | | 100 | | 100 | | 100 | | 100 | 4 | 30 | 1 | 95 | 3 | 95 | | 100 | 3 | 95 |
| | 0.5 | 3 | 95 | 5 | 0 | 5 | 0 | | 100 | 3 | 40 | 4 | 0 | | 100 | 4 | 0 | 2 | 90 | 4 | 0 | 3 | 60 | 3 | 90 |
| 17 | 4 | | 100 | | 100 | | 100 | | 100 | | 100 | | 100 | | 100 | | 100 | | 100 | | 100 | | 100 | | 100 |
| | 2 | | 100 | 3 | 50 | 1 | 90 | | 100 | | 100 | 3 | 80 | | 100 | | 100 | | 100 | | 100 | | 100 | | 100 |
| | 1 | | 100 | 5 | 0 | 1 | 90 | | 100 | 1 | 60 | 3 | 40 | 3 | 95 | 1 | 95 | 3 | 95 | | 100 | | 100 | 3 | 95 |
| | 0.5 | 3 | 95 | 5 | 0 | 3 | 20 | | 100 | 4 | 0 | 4 | 0 | 4 | 60 | 3 | 20 | 3 | 60 | 3 | 95 | 3 | 20 | 4 | 0 |

TABLE II

Post-Emergent Activity

| Product of Example No. | Lbs. per acre | Sugar beets | | Corn | | Oats | | Clover | | Soybeans | | Cotton | | Mustard | | Yellow foxtails | | Barnyard grass | | Crabgrass | | Buckwheat | | Morning-glory | |
|---|---|---|---|---|---|---|---|---|---|---|---|---|---|---|---|---|---|---|---|---|---|---|---|---|---|
| | | Vig | Percent kill | Vig | Percent kill | Vig | Percent kill | Vig | Percent kill | Vig | Percent kill | Vig | Percent kill | Vig | Percent kill | Vig | Percent kill | Vig | Percent kill | Vig | Percent kill | Vig | Percent kill | Vig | Percent kill |
| 8 | 2 | | 100 | 3 | 0 | | 100 | | 100 | | 100 | | 100 | | 100 | | 100 | | 100 | | 100 | | 100 | 4 | 10 |
| | 1 | | 100 | 4 | 0 | | 100 | | 100 | 3 | 20 | 3 | 80 | | 100 | 3 | 95 | | 100 | | 100 | | 100 | 5 | 0 |
| | 0.5 | | 100 | 5 | 0 | 3 | 60 | | 100 | 4 | 0 | 3 | 60 | | 100 | 3 | 80 | 1 | 90 | 3 | 30 | | 100 | 5 | 0 |
| | | | | | | | | Pigweed | | | | Jimson weed | | | | | | | | | | | | | |
| 23 | 2 | | | 5 | 0 | | | | 100 | | | 3 | 80 | | | 2 | [a] 80 | | | 2 | 90 | | | 5 | 0 |
| 24 | 2 | | | 5 | 0 | | | 3 | 50 | | | 3 | 0 | | | 3 | [a] 20 | | | 3 | 20 | | | 5 | 0 |
| 25 | 2 | | | 4 | 0 | | | | 100 | | | | 100 | | | | [a] 100 | | | | 100 | | | 4 | |
| 27 | 2 | | | 5 | 0 | | | | 100 | | | 3 | 70 | | | 3 | [a] 70 | | | 3 | 80 | | | 5 | 0 |

[a] *Setaria italica.*

Emulsifiable concentrate formulations are homogeneous liquid or paste compositions containing the active ingredient which will disperse in water or other liquid carrier to facilitate application of the phytotoxicant to the locus of desired vegetation control. Such emulsifiable concentrate formulations of the active ingredients may contain only the active ingredient with a liquid or solid emulsifying agent or may contain other relatively nonvolatile organic solvents such as isophorone, dioxane, heavy aromatic naphthas, xylene, or dimethyl formamide. The active ingredient in such formulations commonly comprises 10.0% to 70.0% by weight of the phytotoxicant composition.

In place of the particular compositions employed to produce the products of the invention, other compositions and procedures may also be employed to produce products of the invention having substantially the same degree of biological activity.

What is claimed is:

1. A composition having the general structure:

(A)

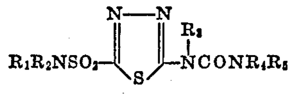

wherein $R_1$ is hydrogen or a substituted or unsubstituted lower alkyl radical having from 1 to 7 carbon atoms, the substituents being selected from the class consisting of halo, hydroxy, cyano, and lower alkoxy, $R_2$ is $R_1$ or a lower alkoxy radical, except that $R_1$ and $R_2$ cannot both be hydrogen, $R_3$ is hydrogen or a lower alkyl radical having from 1 to 7 carbon atoms, $R_4$ is hydrogen, a lower alkyl radical having from 1 to 7 carbon atoms, or a lower cycloalkyl radical, and, $R_5$ is hydrogen, a lower cycloalkyl radical, a lower alkoxy radical, or a substituted or unsubstituted lower alkyl radical having from 1 to 7 carbon atoms, the substituents being selected from the class consisting of halo, hydroxy, cyano, or lower alkoxy, except that $R_4$ and $R_5$ cannot both be hydrogen or a lower cycloalkyl radical, and (B) Tautomers of (A) wherein $R_3$ is hydrogen.

2. The composition according to claim 1 wherein $R_1$ is $CH_3$, $R_2$ is H, $R_3$ is H, $R_4$ is H, and $R_5$ is $CH_3$.

3. The composition of claim 1 wherein $R_1$ is $CH_3$, $R_2$ is $CH_3$, $R_3$ is H, $R_4$ is H, and $R_5$ is $CH_3$.

4. The composition of claim 1 wherein $R_1$ is $$CH_3CH_2CH_2CH_2,$$

$R_2$ is $CH_3$, $R_3$ is H, $R_4$ is H, and $R_5$ is $CH_3$.

5. The composition of claim 1 wherein $R_1$ is $$CH_3CH_2CH_2CH_2,$$

$R_2$ is H, $R_3$ is H, $R_4$ is H, and $R_5$ is $CH_3$.

6. The composition of claim 1 wherein $R_1$ is $CH_3$, $R_2$ is $CH_3$, $R_3$ is H, $R_4$ is H, and $R_5$ is cyclopropyl.

7. The composition of claim 1 wherein $R_1$ is $CH_3$, $R_2$ is $CH_3$, $R_3$ is H, $R_4$ is $CH_3CH_2CH_2CH_2$, and $R_5$ is $CH_3$.

8. The composition of claim 1 wherein $R_1$ is $CH_3$, $R_2$ is $CH_3$, $R_3$ is $CH_3$, $R_4$ is H, and $R_5$ is $CH_3$.

9. The composition of claim 1 wherein $R_1$ is $CH_3$, $R_2$ is $CH_3$, $R_3$ is H, $R_4$ is $CH_3$, and $R_5$ is $OCH_3$.

10. The composition of claim 1 wherein $R_1$ is $CH_3$, $R_2$ is $CH_3$, $R_3$ is H, $R_4$ is H, and $R_5$ is $CH_3CH_2CH_2CH_2$.

11. The composition of claim 1 wherein $R_1$ is $CH_3$, $R_2$ is $CH_3$, $R_3$ is H, $R_4$ is $CH_3$, and $R_5$ is $CH_3$.

12. The composition of claim 1 wherein $R_1$ is $$CH_2{=}CHCH_2,$$

$R_2$ is H, $R_3$ is H, $R_4$ is H, and $R_5$ is $CH_3$.

13. The composition of claim 1 wherein $R_1$ is $C_3H_7$, $R_2$ is $C_3H_7$, $R_3$ is H, $R_4$ is H, and $R_5$ is $CH_3$.

14. The composition of claim 1 wherein $R_1$ is $$ClCH_2CH_2,$$

$R_2$ is H, $R_3$ is H, $R_4$ is H, and $R_5$ is $CH_3$.

References Cited

UNITED STATES PATENTS 2,820,794 1/1958 Young et al. ------ 260—306.8

OTHER REFERENCES

Vaughan et al.: Chem. Abstracts, 51: 3577–8 (1957).

ALEX MAZEL, Primary Examiner

R. J. GALLAGHER, Assistant Examiner

U.S. Cl. X.R.

71—90